July 2, 1935. G. R. ECKSTEIN 2,006,587
DEVICE FOR SEPARATING THE FOREIGN MATTER IN
THE LUBRICANT IN A LUBRICATING SYSTEM
Filed April 21, 1932
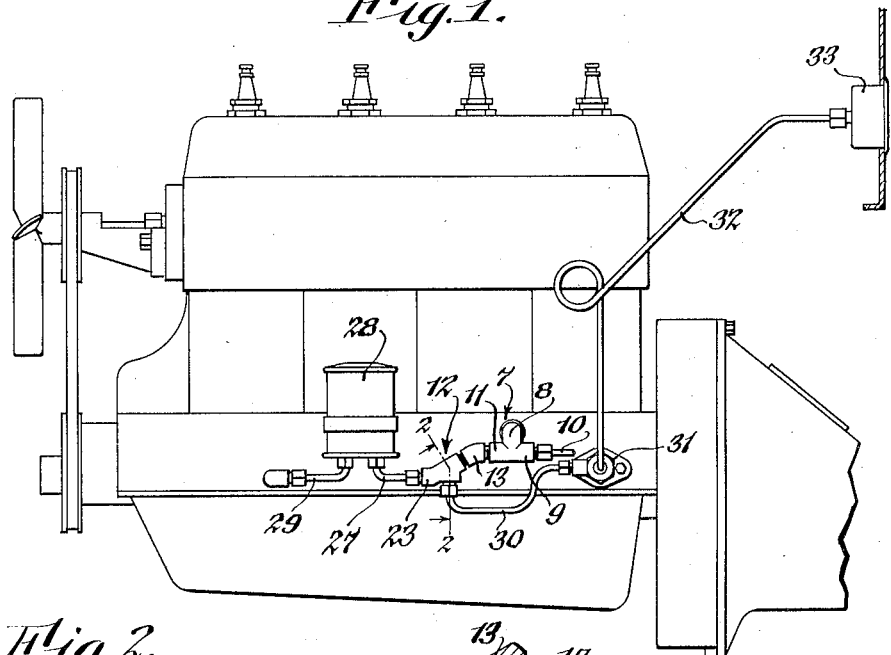
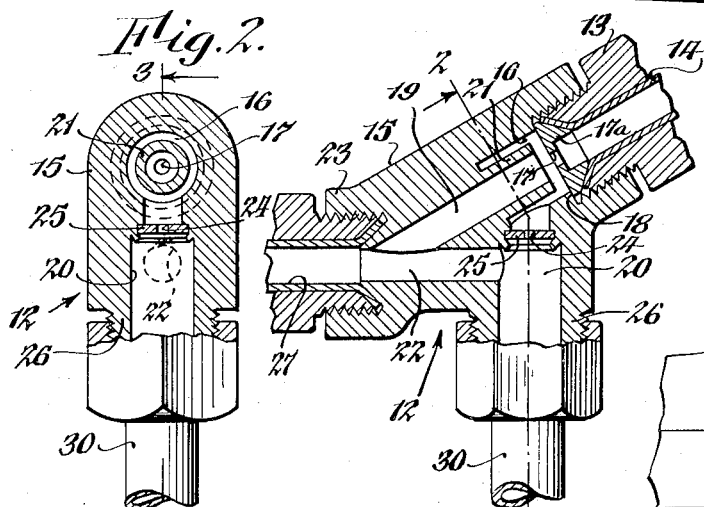
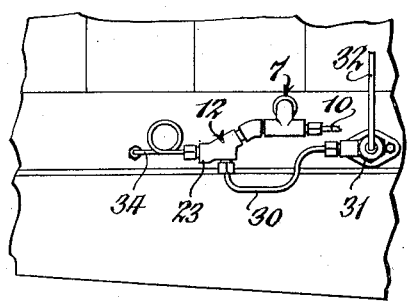
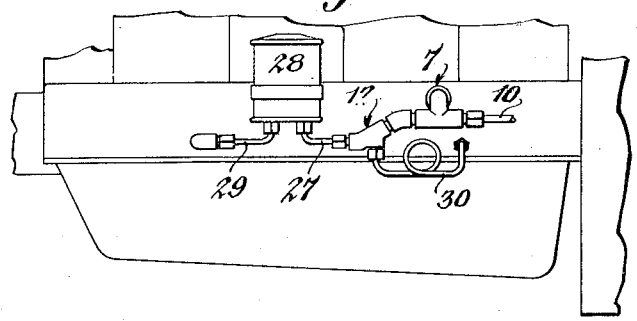
INVENTOR
George R. Eckstein
BY Popp and Powers
ATTORNEYS Patented July 2, 1935

2,006,587

UNITED STATES PATENT OFFICE 2,006,587

DEVICE FOR SEPARATING THE FOREIGN MATTER IN THE LUBRICANT IN A LUBRICATING SYSTEM

George R. Eckstein, Buffalo, N. Y., assignor to Visco Meter Corporation, Buffalo, N. Y., a corporation of New York Application April 21, 1932, Serial No. 606,752

14 Claims. (Cl. 219—57)

This invention relates to a device for incorporation in the lubricating system of an internal combustion engine and the invention contemplates a device which thus incorporated is operative to separate the particles of foreign matter present in one part of the lubricant and add them to another part of the lubricant in which the particles of foreign matter are present in the degree to which they have been assimilated, whereby the lubricant which is directed to a particular part of the system may be conditioned to meet the requirements necessary to enable the attainment of the most effective operation of that part of the system.

The lubricant in the lubricating system of an internal combustion engine gradually deteriorates because of the assimilation of particles of foreign matter such as, for example, carbon in granular form, Babbitt metal from bearings, dust and lint. The presence of such foreign matter is objectionable because of the tendency of the particles to adhere to the walls of, and hence clog up, the various passages through which the lubricant is caused to flow. To avoid this it is the practice to include a filter in the lubricating system, the filter being adapted to separate out the particles of foreign matter as they are assimilated so as to prevent their accumulation in concentrated form in the lubricant. The lubricant is circulated continuously through the filter and hence contains, at any particular time, only a relatively small percentage of foreign matter. Filtration of the lubricant in this manner has the objection that the excess lubricant tends to "wash" the filter thereby preventing the efficient operation of the latter.

The principal object of the present invention is to provide a device which is operative to divide the liquid into two parts, one of which contains the particles of foreign matter in concentrated form and the other of which is substantially free of such particles. Hence, when the device is included in the lubricating system of an internal combustion engine and the system includes a filter that part which contains the particles of foreign matter in concentrated form may be passed through the filter, whereby the efficiency of the latter is maintained at a high value owing to the high percentage of foreign matter suspended in the lubricant. In other words "washing" of the filter is avoided. On the other hand if the lubricating system includes an instrument for indicating the viscosity of the lubricant the lubricant which is passed through the viscosity indicator is preferably the part which is substantially free of particles of foreign matter. It will be apparent, therefore, that a further advantage thus achieved is that possibility of the clogging of the passages of the viscosity indicator is avoided, it being understood, of course, that the advantages of the invention may be obtained in any case where it is desired that the liquid which is delivered to the particular instrument employed in connection with the device contain in concentrated form or be substantially free of the particles of foreign matter present in the liquid in the system.

The invention is illustrated in the accompanying drawing, in which:

Figure 1 is a side elevation of an automobile engine equipped with the device in which the features of the invention are incorporated.

Figure 2 is an enlarged section taken along line 2—2 of Figure 1.

Figure 3 is a section taken along line 3—3 of Figure 2.

Figure 4 is a view similar to Figure 1 in which the device is incorporated in a system which includes a filter but which does not include a viscosity indicating device.

Figure 5 is a view similar to Figure 4 in which the lubricating system includes a viscosity indicating device but which does not include a filter.

In connection with an automobile engine it is the practice to utilize a gauge for indicating the pressure of the lubricant in the lubricating system and for this purpose the latter includes a fitting by which the gauge may be connected in the system, the fitting being secured for convenience upon an outer wall of the engine. When employed in connection with such a system the device may be conveniently included in the system through the same medium as the pressure gauge, that is to say, by the pressure gauge fitting although the connection may be made otherwise if desired.

The fitting 7, as illustrated in Figure 1, is preferably of a standard T construction, its central leg 8 extending through the wall of the engine and being suitably connected to the piping of the lubricating system. The arrangement of the piping is not material and hence is not illustrated. One arm 9 of the fitting is designed for connection with the usual pressure gauge (not shown) through a pipe 10 while the other arm 11 is availed of for the connection of the device 12 in the lubricating system. The arm 11 of the fitting, therefore, is connected to the device 12 by suitable coupling and pipe sections 13 and 14 respectively.

The device 12, as best shown in Figure 3, comprises a body 15 preferably in the form of a casting, the said body being conveniently supported from the engine by the piping of that part of the system in which it is included. The body 15 is formed with an inlet chamber 16 to which the lubricant from the system is delivered through the pipe section 14. The rate at which the lubricant is delivered to the inlet chamber is determined by the size of an opening 17 which is formed in a conical plug 17a, the latter fitting against an annular shoulder 18 at the entrance to the inlet chamber. The plug 17a is secured against the shoulder 18 by the coupling 13, it being noted that the end of the pipe section 14 is flared to conformably fit the conical end of the plug. The opening 17 is adapted to concentrate the liquid and suspended particles of foreign matter so that they are caused to enter the chamber 16 in a concentrated stream.

The inlet chamber 16 is in direct communication with passages 19 and 20 and the body 15 is formed or provided with a hollow extension 21 which provides the entrance to the passage 19, the said extension projecting into the inlet chamber 16 preferably so that the entrance to the passage 19 is opposite to and spaced from the inlet opening 17. The extension 21 takes up the central portion of the inlet chamber so that the latter as to that part which surrounds the extension is annular in form, it being preferred that the extension 21 project beyond the inlet of the passage 20 in the manner shown. The passage 19 communicates with a passage 22 which is also formed in the body 15, the outlet of which terminates in an extension 23 of the body.

The passage 20 is in communication with the inlet chamber 16 through an opening 24 which is formed in a disk 25, the latter being suitably secured adjacent the entrance to the passage 20 and being adapted to control the direction of flow of the lubricant through the said passage as well as to concentrate it in substantially the same manner that the opening 17 concentrates the lubricant which enters the passage 19. The passage 20 continues past the entrance to the passage 22 and terminates in an extension 26 formed in the body of the device.

As best shown in Figure 1 the extension 23 is connected by a pipe 27 to the inlet of a filter 28, the latter being of conventional construction. The outlet pipe 29 of the said filter returns the lubricant which has passed through the filter to the lubricating system in the usual manner after having performed its function. The extension 26 of the device is connected by a pipe 30 to the inlet of a viscosity indicating device 31. The latter is preferably of the type disclosed in the co-pending application of Albert B. Schultz, Serial No. 511,796, filed January 28, 1931. The lubricant in its passage through the device 31 creates a counter-pressure in the device which varies in accordance with the viscosity of the lubricant. This counter pressure is transmitted by a suitable tube 32 to pressure gauge 33. The said gauge is so designed that the variations in the counter-pressures set up in the device are translated into viscosity units so that the operator of the vehicle is advised continuously of the viscosity of the lubricant and hence is enabled to determine when the viscosity of the lubricant has reached a point where its further use is attendant with the possibility of injury to the bearing surfaces of the engine. The lubricant which is delivered continuously to the viscosity indicating device 31 is returned continuously to the lubricating system after it has served its purpose.

In the operation of the engine the lubricant which is caused to flow to the bearing surfaces gradually assimilates particles of foreign matter of various kinds such as, for example, particles of Babbitt metal from the bearings, particles of carbon in granular form and particles of dust. These particles of foreign matter not only impair the effectiveness of the lubricant but also tend to clog the various passages through which the lubricant is caused to flow. It is for this reason that it is preferable to employ a filter, the latter being adapted to separate out of the lubricant the particles of foreign matter as they are assimilated.

The lubricant in its passage to the filter 28 is caused to flow through the device 12. As it enters the inlet chamber 16 of the device, those particles of foreign matter of greater specific gravity than the lubricant owing to their greater inertia continue across the space between the plug 17a and the extension 21 and enter the passage 19. These particles together with the lubricant that carries them are directed through the passage 22 and through the pipe 27 and from the latter are conducted to the filter 28. In the filter these heavier particles are removed from the lubricant and the latter is returned through the pipe 29 to the lubricating system. The remainder of the lubricant and those particles of foreign matter which in specific gravity are lighter than the lubricant are forced outwardly into the annular chamber about the extension 16 and enter the passage 20 through the opening 24 in a concentrated stream. The lubricant which is delivered to the passage 20 being of greater specific gravity than the particles of foreign matter carried by it, the lighter particles of foreign matter are forced outwardly so that a substantial portion of them enter the passage 22 and are conducted to the pipe 27 by which they, with the heavier particles from the passage 19, are conducted to the filter 28.

From the foregoing it will be apparent, that as the lubricant is delivered to the inlet chamber 16 the heavier particles of foreign matter are caused to enter the passage 19 while the remainder of the lubricant which contains the lighter particles of foreign matter is caused to flow through the opening 24 into the passage 20. In the latter passage the greater portion of the particles of foreign matter which are of lighter specific gravity than the lubricant are caused to flow through the passage 22. Hence the lubricant which is discharge through the outlet connection 26 into the pipe 30 contains only a relatively small percentage of foreign matter, the greater part of the foreign matter both of a higher specific gravity than the lubricant and of a lower specific gravity than the lubricant having been separated and concentrated in that portion of the lubricant which is dischaged from the device throught the extension 23. In the embodiment shown in Figure 1 the pipe 27 is connected to the inlet of the filter which is employed in connection with the lubricating system. The device is of particular utility when employed in this manner as it serves to deliver the foreign matter to the filter in concentrated form, that is to say, the percentage of foreign matter relative to the percentage of lubricant is high. This is desirable as it enables separation of the foreign matter from the lubricant without the necessity of delivering the lubricant to the filter in large quantities, the latter being objectionable for the reason that the excess lubricant tends to carry the particles of foreign matter through the filter, that is to say, the accumulation of the foreign matter in the filter in the manner desired is prevented. The lubricant from which the greater portion of the foreign matter has been separated may, as shown in Figure 1, be delivered to the viscosity indicating device 31 as shown and the effectiveness of the latter over long periods of use is thereby insured as the possibility of the passages of the device being clogged by particles of foreign matter is minimized. It is understood, of course, that the lubricant from which the particles of foreign matter have been separated in the manner described may be conducted to any other device where the effectiveness of the latter is increased by the removal of the particles of foreign matter from the lubricant or this part of the lubricant may be returned by the pipe 30 directly to the crank case as shown in Figure 4.

In the embodiment illustrated by Figure 5 the device 12 is employed in connection with a viscosity indicating device 31, as in Figure 1. In the present embodiment, however, the lubricant which is discharged through the extension 23 of the device, that is to say, that portion of the lubricant which contains in concentrated form the particles of foreign matter instead of being conducted to a filter, as in Figure 1, is conducted by a pipe 34 directly to the crank case of the engine. Thus, in this embodiment, although no filter is employed in the lubricating system, that portion of the lubricant which is delivered to the viscosity indicating device 31 or a similarly located device has removed therefrom the greater portion of the foreign matter originally contained in it. Thus, in this embodiment the effectiveness of the device 31 over long periods of time is also insured.

From the foregoing it will be apparent that the device is operative to divide the liquid which is delivered to it into two streams, one of which contains in concentrated form particles of foreign matter originally present in the entire body of liquid delivered to the device and the other of which is substantially free of particles of foreign matter. The device, therefore, may be so arranged in the system so that the liquid which is conducted from it to a particular part of the system is conditioned to obtain the most effective operation of that part of the system.

I claim as my invention:

1. A device for use in a lubricating system in which the lubricant is caused to flow under pressure, said device including a chamber having an inlet through which lubricant from said system is caused to enter said chamber, a passage having its entrance so located relative to said inlet that as the lubricant enters said chamber the suspended heavy particles of foreign matter owing to their inertia cross the space between said inlet and the entrance of said passage and enter the latter, whereby the heavy particles of foreign matter are concentrated and caused to enter said passage, the passage of the heavy particles of foreign matter across the said chamber in this manner forcing a substantial part of the lubricant away from the entrance to said passage and a second passage which is in communication with said chamber, the entrance to said second passage being so located that the lubricant which fails to enter said first mentioned passage enters it.

2. A device for use in a lubricating system in which the lubricant is caused to flow under pressure, said device including a chamber having an inlet through which lubricant from said system is caused to enter said chamber, a passage having an entrance which in cross-sectional area is larger than the area of said inlet and being so located relative to said inlet that as the lubricant enters said chamber the suspended heavy particles of foreign matter owing to their inertia cross the space between said inlet and the entrance to said passage and enter the latter whereby the heavy particles of foreign matter are condensed and caused to enter said passage, the passage of the heavy particles of foreign matter across the inlet chamber in this manner forcing a substantial part of the lubricant away from the entrance to said passage and a second passage which is in communication with said chamber, the entrance of said second passage being so located that the lubricant which fails to enter said first mentioned passage enters it.

3. A device for use in a lubricating system in which the lubricant is caused to flow under pressure, said device including a chamber having an inlet through which lubricant from said system is caused to enter said chamber, a passage communicating with said chamber, a portion of said passage being provided by a hollow extension which projects into said chamber toward said inlet so that the suspended heavy particles of foreign matter owing to their inertia cross the space between said inlet and the entrance to said passage and enter the latter, whereby the heavy particles of foreign matter are concentrated and caused to enter said passage, the passage of the heavy particles of foreign matter across the said chamber in this manner forcing a substantial part of the lubricant laterally away from the entrance to said passage and a second passage in communication with said chamber and having its entrance so located that the lubricant which fails to enter said first mentioned passage enters it.

4. A device for use in a lubricating system in which the lubricant is caused to flow under pressure, said device including a chamber having an inlet through which lubricant from said device is caused to enter said chamber, a passage communicating with said chamber, a portion of said passage being provided by a hollow extension which projects into said chamber toward said inlet and which provides an entrance to said passage which in cross-sectional area is greater than the area of said inlet so that as the lubricant enters said chamber the suspended heavy particles of foreign matter owing to their inertia cross the space between said inlet and the entrance to said passage and enter the latter, whereby the heavy particles of foreign matter are concentrated and caused to enter said passage, the passage of the heavy particles of foreign matter across said chamber in this manner forcing a substantial part of the lubricant laterally away from the entrance to said passage and a second passage in communication with said chamber and having its entrance so located that the lubricant which fails to enter said first mentioned passage enters it.

5. A device for use in a lubricating system in which a lubricant is caused to flow under pressure, said device including a chamber having an inlet through which lubricant from said system is caused to enter said chamber, a passage having its entrance so located relative to said inlet so that as the lubricant enters said chamber the suspended heavy particles of foreign matter owing to their inertia cross the space between said inlet and the entrance of said passage and enter the latter, whereby the heavy particles of foreign matter are concentrated and caused to enter said passage, the passage of the heavy particles of foreign matter across the inlet chamber in this manner forcing a substantial part of the lubricant away from the entrance to said passage, a second passage which is in communication with said chamber, the entrance to said second passage being so located that the lubricant which fails to enter said first mentioned passage enters it and a branch passage communicating with said second passage, said second passage being so designed that the lubricant is directed past the entrance to said branch passage in such a manner that the light particles of foreign matter are forced outwardly, whereby a substantial portion of them enter said branch passage.

6. A device for use in a lubricating system in which the lubricant is caused to flow under pressure, said device including a chamber having an inlet through which lubricant from said system is caused to enter said chamber, a passage having its entrance so located relative to said inlet so that as the lubricant enters said chamber the suspended heavy particles of foreign matter owing to their inertia cross the space between said inlet and the entrance of said passage and enter the latter, whereby the heavy particles of foreign matter are concentrated and caused to enter said passage, the passage of the heavy particles of foreign matter across the inlet chamber in this manner forcing a substantial part of the lubricant away from the entrance to said passage, a second passage which is in communication with said chamber, the entrance to said second passage being so located that the lubricant which fails to enter said first mentioned passage enters it and a branch passage communicating with said second passage, said second passage being so designed that the lubricant is directed past the entrance of said branch passage in such a manner that the light particles of foreign matter are forced outwardly, whereby a substantial portion of them enter said branch passage, said first passage and said branch passage being in communication, whereby the concentrated heavy and light particles of foreign matter are discharged from the device in a common stream.

7. A device for use in a lubricating system in which the lubricant is caused to flow under pressure, said device including a chamber having an inlet through which lubricant from said system is caused to enter said chamber, a passage having an entrance which in cross-sectional area is larger than the area of said inlet and being so located relative to said inlet that as the lubricant enters said chamber the suspended heavy particles of foreign matter owing to their inertia cross the space between said inlet and the entrance to said passage and enter the latter, whereby the heavy particles of foreign matter are concentrated and caused to enter said passage, the passage of the heavy particles of foreign matter across the said chamber in this manner forcing a substantial part of the lubricant away from the entrance to said passage, a second passage which is in communication with said chamber, the entrance of said second passage being so located that the lubricant which fails to enter said first mentioned passage enters it and a branch passage communicating with said second passage, said second passage being so designed that the lubricant is directed past the entrance to said branch passage in such a manner that the light particles of foreign matter are forced outwardly, whereby a substantial portion of them enter said branch passage.

8. A device for use in a lubricating system in which the lubricant is caused to flow under pressure, said device including a chamber having an inlet through which lubricant from said system is caused to enter said chamber, a passage having an entrance which in cross-sectional area is larger than the area of said inlet and being so located relative to said inlet that as the lubricant enters said chamber the suspended heavy particles of foreign matter owing to their inertia cross the space between said inlet and the entrance to said passage and enter the latter, whereby the heavy particles of foreign matter are concentrated and caused to enter said passage, the passage of the heavy particles of foreign matter across the inlet chamber in this manner forcing a substantial part of the lubricant away from the entrance to said passage, a second passage which is in communication with said chamber, the entrance of said second passage being so located that the lubricant which fails to enter said first mentioned passage enters it and a branch passage communicating with said second passage, said second passage being so designed that the lubricant is directed past the entrance of said branch passage in such a manner that the light particles of foreign matter are forced outwardly, whereby a substantial portion of them enter said branch passage, said first passage and said branch passage being in communication, whereby the concentrated heavy and light particles of foreign matter are discharged from the device in a common stream.

9. A device for use in a lubricating system in which the lubricant is caused to flow under pressure, said device including a chamber having an inlet through which lubricant from said system is caused to enter said chamber, a passage communicating with said chamber, a portion of said passage being provided by a hollow extension which projects into said chamber toward said inlet so that the suspended heavy particles of foreign matter owing to their inertia cross the space between said inlet and the entrance to said passage and enter the latter, whereby the heavy particles of foreign matter are concentrated and caused to enter said passage, the passage of the heavy particles of foreign matter across the said chamber in this manner forcing a substantial part of the lubricant laterally away from the entrance to said passage, a second passage in communication with said chamber and having its entrance so located that the lubricant which fails to enter said first mentioned passage enters it and a branch passage communicating with said second passage, said second passage being so designed that the lubricant is directed past the entrance to said branch passage in such a manner that the light particles of foreign matter are forced outwardly, whereby a substantial portion of them enter said branch passage.

10. A device for use in a lubricating system in which the lubricant is caused to flow under pressure, said device including a chamber having an inlet through which lubricant from said system is caused to enter said chamber, a passage communicating with said chamber, a portion of said passage being provided by a hollow extension which projects into said chamber toward said inlet so that the suspended heavy particles of foreign matter owing to their inertia cross the space between said inlet and the entrance to said passage and enter the latter, whereby the heavy particles of foreign matter are concentrated and caused to enter said passage, the passage of the heavy particles of foreign matter across the said chamber in this manner forcing a substantial part of the lubricant laterally away from the entrance to said passage, a second passage in communication with said chamber and having its entrance so located that the lubricant which fails to enter said first mentioned passage enters it and a branch passage communicating with said second passage, said second passage being so designed that the lubricant is directed past the entrance of said branch passage in such a manner that the light particles of foreign matter are forced outwardly, whereby a substantial portion of them enter said branch passage, said first passage and said branch passage being in communication, whereby the concentrated heavy and light particles of foreign matter are discharged from the device in a common stream.

11. A device for use in a lubricating system in which the lubricant is caused to flow under pressure, said device including a chamber having an inlet through which lubricant from said device is caused to enter said chamber, a passage communicating with said chamber, a portion of said passage being provided by a hollow extension which projects into said chamber toward said inlet and which provides an entrance to said passage which in cross-sectional area is greater than the area of said inlet so that as the lubricant enters said chamber the suspended heavy particles of foreign matter owing to their inertia cross the space between said inlet and the entrance to said passage and enter the latter, whereby the heavy particles of foreign matter are concentrated and caused to enter said passage, the passage of the heavy particles of foreign matter across said chamber in this manner forcing a substantial part of the lubricant laterally away from the entrance to said passage, a second passage in communication with said chamber and having its entrance so located that the lubricant which fails to enter said first mentioned passage enters it and a branch passage communicating with said second passage, said second passage being so designed that the lubricant is directed past the entrance to said branch passage in such a manner that the light particles of foreign matter are forced outwardly, whereby a substantial portion of them enter said branch passage.

12. A device for use in a lubricating system in which the lubricant is caused to flow under pressure, said device including a chamber having an inlet through which lubricant from said device is caused to enter said chamber, a passage communicating with said chamber, a portion of said passage being provided by a hollow extension which projects into said chamber toward said inlet and which provides an entrance to said passage which in cross-sectional area is greater than the area of said inlet so that as the lubricant enters said chamber the suspended heavy particles of foreign matter owing to their inertia cross the space between said inlet and the entrance to said passage and enter the latter, whereby the heavy particles of foreign matter are concentrated and caused to enter said passage the passage of the heavy particles of foreign matter across said chamber in this manner forcing a substantial part of the lubricant laterally away from the entrance to said passage, a second passage in communication with said chamber and having its entrance so located that the lubricant which fails to enter said first mentioned passage enters it and a branch passage communicating with said second passage, said second passage being so designed that the lubricant is directed past the entrance of said branch passage in such a manner that the light particles of foreign matter are forced outwardly, whereby a substantial portion of them enter said branch passage, said first passage and said branch passage being in communication, whereby the concentrated heavy and light particles of foreign matter are discharged from the device in a common stream.

13. A lubricating system for an internal combustion engine having a pipe line through which the lubricant is caused to flow under pressure, a device included in said line, said device being formed with an inlet chamber and having an inlet through which lubricant from said system is caused to enter said chamber, a passage as a part of said device which discharges into one part of said system and which has its entrance so located relative to said inlet that as the lubricant enters said chamber the suspended heavy particles of foreign matter owing to their inertia cross the space between said inlet and the entrance to said passage, whereby the heavy particles of foreign matter are concentrated and conducted to one part of the lubricating system, the passage of the heavy particles of foreign matter across said chamber in this matter forcing a substantial part of the lubricant away from the entrance to said passage and a second passage as a part of said device which is in communication with another part of the lubricating system and the entrance of which is so located that the lubricant which fails to enter said first mentioned passage is conducted to the other part of said system.

14. A lubricating system for an internal combustion engine having a pipe line through which lubricant is caused to flow under pressure, a device included in said line, said device being formed with an inlet chamber and having an inlet through which lubricant from said system is caused to enter said chamber, a passage as a part of said device which discharges into one part of said system and which has its entrance so located relative to said inlet that as the lubricant enters said chamber the suspended heavy particles of foreign matter owing to their inertia cross the space between said inlet and the entrance to said passage, whereby the heavy particles of foreign matter are concentrated and conducted to one part of the lubricating system, the passage of the heavy particles of foreign matter across said chamber in this manner forcing a substantial part of the lubricant away from the entrance to said passage, a second passage as a part of said device which is in communication with another part of the lubricating system and the entrance of which is so located that the lubricant which fails to enter said first mentioned passage enters it and a branch passage communicating with said second passage, said second passage being so designed that the lubricant is directed past the entrance of said branch passage in such a manner that the light particles of foreign matter are forced outwardly, whereby a substantial portion of them enter said branch passage, said first mentioned passage and said branch passage being in communication, whereby the concentrated heavy and light particles of foreign matter are conducted to the same part of the system.

GEORGE R. ECKSTEIN.